United States Patent
Hagino et al.

(10) Patent No.: US 8,191,843 B2
(45) Date of Patent: Jun. 5, 2012

(54) MUDGUARD MOUNTING STRUCTURE

(75) Inventors: Tatsuhiro Hagino, Utsunomiya (JP);
Daisuke Watanabe, Takanezawa-machi (JP)

(73) Assignee: Honda Access Corp., Niiza-shi, Saitama (JP)

( * ) Notice: Subject to any disclaimer, the term of this patent is extended or adjusted under 35 U.S.C. 154(b) by 0 days.

(21) Appl. No.: 13/016,277

(22) Filed: Jan. 28, 2011

(65) Prior Publication Data

US 2011/0186704 A1 Aug. 4, 2011

(30) Foreign Application Priority Data

Feb. 4, 2010 (JP) ................................. 2010-023520

(51) Int. Cl.
*A47B 96/00* (2006.01)

(52) U.S. Cl. .................... 248/222.14; 280/847; 280/154; 248/229.1; 248/223.31; 248/220.21

(58) Field of Classification Search .................. 280/847, 280/848, 851, 154; 248/222.14
See application file for complete search history.

(56) References Cited

U.S. PATENT DOCUMENTS

| | | | | |
|---|---|---|---|---|
| 3,333,868 A | * | 8/1967 | Sogoian ........................ | 280/851 |
| 5,967,553 A | * | 10/1999 | Cominsky ..................... | 280/847 |
| 7,040,662 B2 | * | 5/2006 | Barr et al. ...................... | 280/847 |
| 7,537,243 B1 | * | 5/2009 | Perry ............................. | 280/847 |
| 7,578,526 B2 | * | 8/2009 | Jaeger .......................... | 280/848 |

FOREIGN PATENT DOCUMENTS

| | | |
|---|---|---|
| JP | 49-103130 A | 9/1974 |
| JP | 54-81547 U | 6/1979 |
| JP | 56-83475 U | 7/1981 |
| JP | 57-87765 A | 6/1982 |
| JP | 3-15279 U | 2/1991 |
| JP | 09-263266 A | 10/1997 |
| JP | 3873038 B2 | 1/2007 |

* cited by examiner

*Primary Examiner* — Terrell McKinnon
*Assistant Examiner* — Monica Millner
(74) *Attorney, Agent, or Firm* — Westerman, Hattori, Daniels & Adrian, LLP

(57) ABSTRACT

There is provided a mudguard mounting structure, superior in versatility and capable of reducing the number of steps for mounting. The present invention is a structure for mounting a mudguard on a rear bumper of a vehicle, in which a mounting member is used to mount the mudguard on the rear bumper, said mounting member comprising a clamping portion on one side thereof for clamping an end portion of the rear bumper, and a mounting portion on which the mudguard is mounted on an other side. The mounting member can be mounted on the rear bumper by allowing the clamping portion to clamp the aforementioned end portion, thereby reducing the number of parts and steps for mounting, and costs. Since the mounting member excels in versatility, costs can be further reduced. An engagement portion for engaging the rear bumper is provided on an inner surface of the clamping portion.

4 Claims, 8 Drawing Sheets

MUDGUARD MOUNTING STRUCTURE

BACKGROUND OF THE INVENTION

1. Field of the Invention

The present invention relates to a mudguard mounting structure, for mounting a mudguard to a rear bumper of a vehicle.

2. Description of Related Art

Conventionally, there has been in use an auto-part such as a fender liner, a mudguard or the like to shield a vehicle body from flying rocks and mud at the time of driving the vehicle. When mounting an auto accessory such as a liner, a mudguard or the like, it is important to provide an outer appearance of the vehicle taking into account a balance between the auto accessory and other auto-parts in order not to impair the design or the like of the vehicle as a whole.

In recent years, wide tires have often been mounted on RV vehicles or the like. However, when mounting such tires, a flange portion serving as a turn-back portion of a rear fender has to be formed short in a cross direction thereof as compared to a case in which average tires are to be mounted. Theoretically, a flange portion serving as a turn-back portion of a rear bumper also needs to be formed short in a cross direction thereof in order to achieve unity in the outer appearance of the rear fender and the rear bumper (improve the outer appearance). Particularly, with regard to a rear bumper made of synthetic resin, there has been a need to improve strength of mounting using a reinforcement member or the like, when wide tires are to be mounted to thereby cause the turn-back portion to be formed short in the cross direction.

To meet such need, there has been proposed a mudguard mounting structure capable of ensuring strength of mounting of a mudguard relative to a rear bumper with a short flange portion, and not impairing aestheticness. Such mudguard mounting structure comprises a mounting member having a first mounting surface to be mounted on the rear bumper and longitudinally matching an inner surface shape of the rear bumper, and a second mounting surface for holding the mudguard. Further, a mounting portion through which the first mounting surface is fixed to the rear bumper is covered by a circumferential portion of the mudguard (e.g., see Japanese patent No. 3873038).

SUMMARY OF THE INVENTION

According to the aforementioned conventional art, the mudguard mounting structure comprises the mounting member having the first mounting surface to be mounted on the rear bumper and longitudinally matching the inner surface shape of the rear bumper, and the second mounting surface for holding the mudguard. Therefore, the strength of the mounting portion of the mudguard and the strength of the rear bumper made of synthetic resin can be improved. Further, since the mounting portion is covered by the circumferential portion of the mudguard, the outer appearance is not impaired.

However, a rear bumper on which a mudguard is mounted varies in its shape with respect to each type of vehicle, thus requiring designing the mounting member with respect to each type of vehicle. Namely, the mudguard mounting structure according to the conventional art is inferior in versatility.

Further, according to the aforementioned conventional art, holes need to be bored on the rear bumper for fixing the mounting member thereto, and screws are used to fix the mounting member, thus increasing costs due to increase in the number of parts needed, weight and the number of steps needed for mounting.

Furthermore, according to the aforementioned conventional art, since screws are used to fix the mounting member, a clearance needs to be provided between a screw head portion protruding from a surface of the rear bumper and an inner surface of the mudguard, thus resulting in a problem of restricting the design of the mudguard.

Here, in view of the aforementioned problems, it is an object of the present invention to provide a mudguard mounting structure, superior in versatility and capable of reducing the number of steps needed for mounting.

In order to achieve the aforementioned objectives, the invention according to a first aspect is a mudguard mounting structure for mounting a mudguard on a rear bumper of a vehicle, in which a mounting member is used to mount the mudguard on the rear bumper, said mounting member comprising a clamping portion on one side thereof for clamping an end portion of the rear bumper and a mounting portion on which the mudguard is mounted on an other side.

Further, according to the invention described in a second aspect, an engagement portion is provided on an inner surface of the clamping portion for engaging the rear bumper.

Furthermore, according to the invention described in a third aspect, the clamping portion has springiness.

According to the mudguard mounting structure described in the first aspect of the present invention, the mounting member can be mounted on the rear bumper by allowing the clamping portion to clamp the end portion of the rear bumper, thereby reducing the number of steps needed for mounting, and thus reducing costs. In addition, since the mounting member is superior in versatility, further reduction in costs can be expected.

Further, according to the mudguard mounting structure described in the second aspect of the present invention, no bolt is required when fixing the mounting member to the rear bumper, thus making mounting easier and reducing the number of parts needed.

Furthermore, according to the mudguard mounting structure described in the third aspect of the present invention, not only the mounting member can be easily mounted on the rear bumper, but, vibration generated at the time of driving the vehicle can be absorbed, thus improving mounting safety.

BRIEF DESCRIPTION OF THE DRAWINGS

FIG. 2 is a series of diagrams showing a mounting member of the first embodiment of the present invention, in which

DETAILED DESCRIPTION OF THE INVENTION

Figure 1:
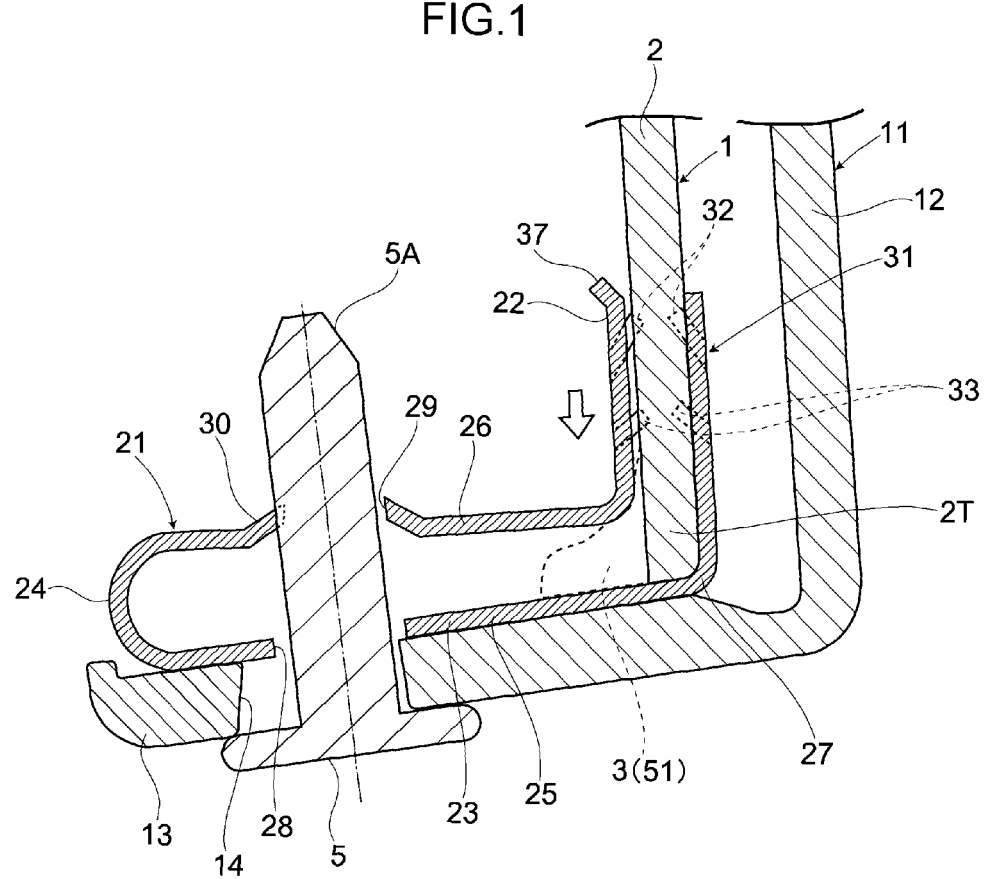
FIG. 1 is a cross sectional view showing a first embodiment of the present invention.

A first embodiment of the present invention is described hereunder with reference to the accompanying drawings.
(First Embodiment)

As shown in FIG. 1 through FIG. 7, a mudguard mounting structure of the present invention allows a mudguard 11 to be mounted on and fixed to a mounting member 21 serving as a bracket via a screw 5, thus allowing the mudguard 11 to be mounted on and fixed to a rear bumper 1 of a vehicle. The mounting member 21 is thus mounted on and fixed to the mudguard 11 via the screw 5. Here, a tapping screw is employed as the screw 5.

The rear bumper 1 is made of synthetic resin. Further, the rear bumper 1 has a side surface portion 2 extending in a vehicle side surface direction (vehicle front-back direction), and a flange portion 3 formed on an end portion 2T of such side surface portion 2 and bended toward a vehicle cross direction (vehicle cross direction). Furthermore, the mudguard 11 is also made of synthetic resin and has a circumferential edge portion 12 extending so as to cover the vicinity of the end portion 2T of the rear bumper 1 and a mounting edge portion 13 facing a tire surface (not shown).

The mounting member 21 comprises a clamping portion 22 for clamping the end portion 2T of the rear bumper 1 on one side thereof, and a mounting portion 23 on which the mounting edge portion 13 of the mud guard 11 is mounted on an other side. Specifically, the mounting member 21 comprises on a one end thereof a bend-back portion 24 formed by bending a plate. An inner plate 26 and an outer plate 25 that are distant from each other by a substantially constant width extend from such bend-back portion 24 toward an other end. Such plates 25, 26 are so arranged that they face each other and have a bended portion 27 formed in a midsection thereof, thereby forming the clamping portion 22 branching toward the one side of the mounting member 21. Namely, the clamping portion 22 extending in a substantial vehicle front-back direction and the mounting portion 23 extending in a substantial vehicle left-right direction are respectively provided on the aforementioned one and other sides of the mounting member 21 across the bended portion 27. Here, the bending angle of the bended portion 27 is substantially identical with an angle between the side surface portion 2 and the mounting edge portion 13 when the mudguard 11 is mounted on the rear bumper 1.

The mounting member 21 has springiness, and a spring steel such as SUS430 or the like is, for example, employed as the mounting member 21. In addition, the mounting member 21 exhibits elastic restorability when subjected to a force urging the clamping portion 22 to open. Further, with regard to the clamping portion 22, the outer plate 25 and the inner plate 26 are substantially parallel to each other, and a distance between the outer plate 25 and the inner plate 26 is slightly larger than the thickness of the end portion 2T. Furthermore, with regard to the mounting portion 23, the distance between the outer plate 25 and the inner plate 26 is slightly narrower toward the bended portion 27.

Figure 2A:
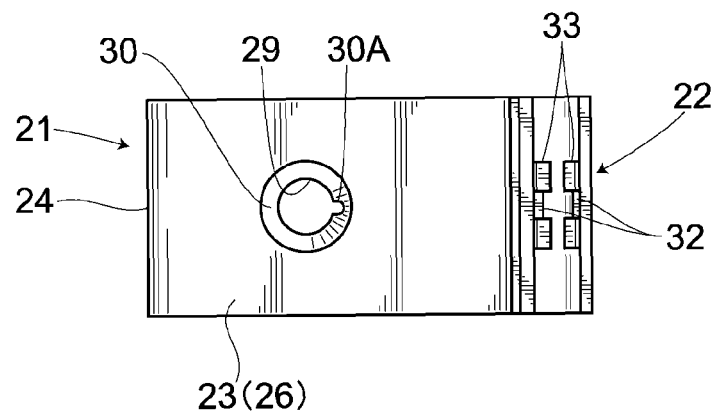
FIG. 2A is a back view.
Figure 2B:
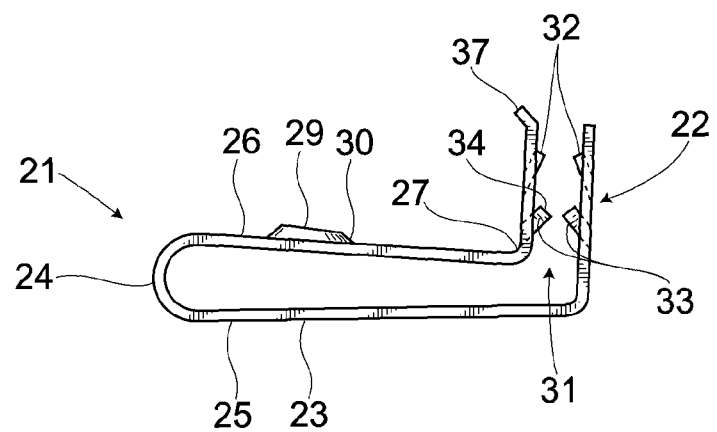
FIG. 2B is a plan view and FIG. 2C is a front view thereof.
Figure 2C:
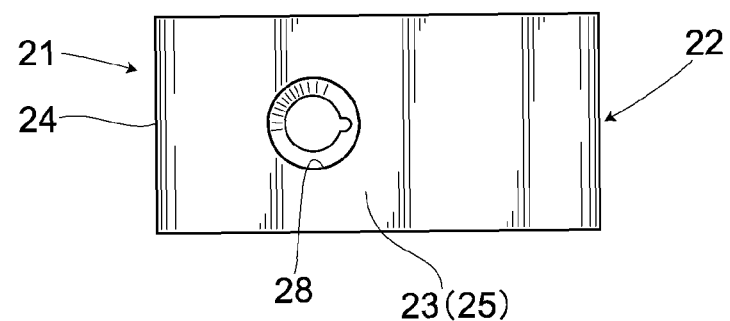

As shown in FIG. 2, with regard to the mounting portion 23, a through hole 28 is bored on the outer plate 25, and a screw hole 29 corresponding to such through hole 28 is bored on the inner plate 26. The screw hole 29 is actually formed on a front end of a slanting cylindrical portion 30 protruding outwardly from the inner plate 26. The slanting cylindrical portion 30 is so formed that it becomes smaller toward the front end thereof, and there is formed on such slanting cylindrical portion 30 a cutout 30A communicated with the screw hole 29. Further, the screw hole 29 is smaller than a screw portion 5A of the screw 5. Therefore, the screw hole 29 is caused to undergo plastic deformation and enlarge due the cutout 30A when screwing the screw portion 5A thereinto, and a female screw portion can thus be formed in the screw hole 29 due to the screw portion 5A, thus making it possible to reliably fix the screw thereinto.

Figure 3:
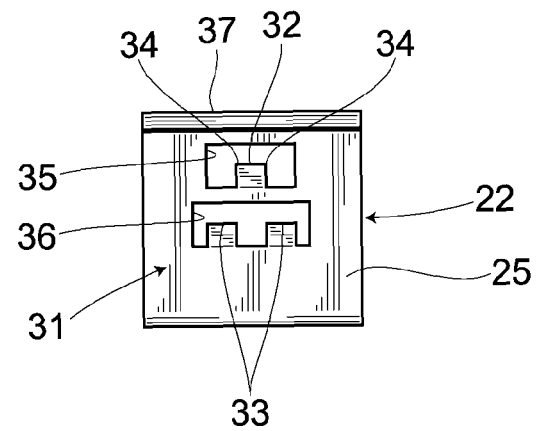
FIG. 3 is a side view of the mounting member of the first embodiment of the present invention.

On an inner side of the clamping portion 22, there is provided an engagement portion 31 for engaging an inner and an outer surface of the end portion 2T of the rear bumper 1. Such engagement portion 31 comprises a plurality of claw members 32, 33, 33 serving as engagement parts. The claw members 32, 33, 33 are formed by cutting out and then bending the outer plate 25 and the inner plate 26 toward an inner side of the clamping portion 22. Further, such claw member is formed into a substantial rectangular shape having two corner portions 34, 34. Here, as shown in FIG. 3, a cutout section 35 on a front end side of the clamping portion 22 is formed into an inverted concave shape, while a cutout section 36 located on a base end side of the clamping portion 22 is formed into a tipped "E" shape. In addition, the claw members 32, 33 formed by cutting out and bending the inner plate and the outer plate have springiness.

As shown in FIG. 2 and FIG. 3, according to this embodiment, the claw member 32 is provided in the center of a cross direction of the clamping portion 22 on the front end side thereof. Further, a plurality of the claw members 33, 33 are provided on the base end side of the clamping portion 22 along with the claw member 32. Specifically, the claw members 33, 33 are widely provided in the cross direction and face the foregoing claw member 32 therebetween. Furthermore, the corner portions 34 of the claw members 32, 33, 33 are so formed that they slant toward the front end of the clamping portion 22, in which the angles of the claw members 33, 33 on the base end side are formed larger than that of the claw member 32 on the front end side. In this way, the end portion 2T can be easily inserted between the claw members 32, 32 located on the front end side and having small angles. Meanwhile, the end portion 2T can not be easily disengaged from the claw members 33, 33 once inserted therebetween.

Further, with regard to the clamping portion 22, a slanted guiding edge 37 slanting outwardly is formed on a front end of the inner plate 26, thereby making it easier for the end portion 2T to be inserted into the clamping portion 22.

Figure 7:
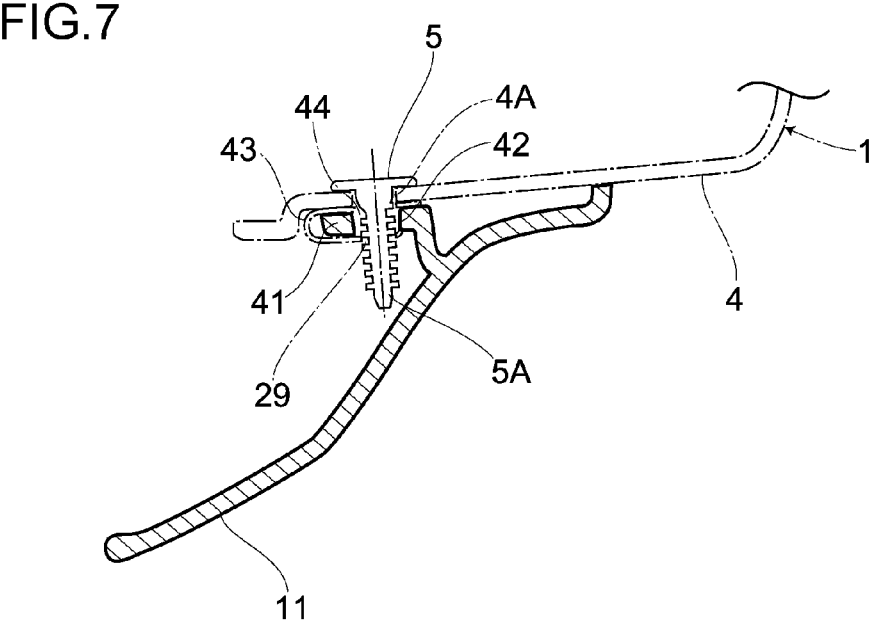
FIG. 7 is a cross sectional view taken on line A-A in FIG. 6 of the first embodiment of the present invention.

As shown in FIG. 7, on an inner section of the mudguard 11, there is integrally formed a bottom surface mounting part 41 protruding therefrom. Such bottom surface mounting part 41 is mounted on a bottom surface portion 4 of the rear bumper 1, and a through hole 42 is bored on the bottom surface mounting part 41. Further, there is provided a nut member 43 formed into a substantial "U" shape and made of a metallic material such as stainless steel or the like. While a through hole 44 is bored on one side of such nut member 43, the aforementioned screw hole 29 is bored on an other side thereof. The nut member 43 is so arranged that the bottom surface mounting part 41 is sandwiched therein.

The screw portion 5A is then inserted through a through hole 4A of the bottom surface portion 4 and the through holes 44, 42, followed by screwing the screw portion 5A into the screw hole 29, thereby allowing the bottom surface mounting part 41 to be mounted on and fixed to the bottom surface portion 4. Here, the through hole 4A of the rear bumper 1 may be bored when mounting the mudguard 11 instead of when manufacturing the rear bumper 1.

Figure 4:
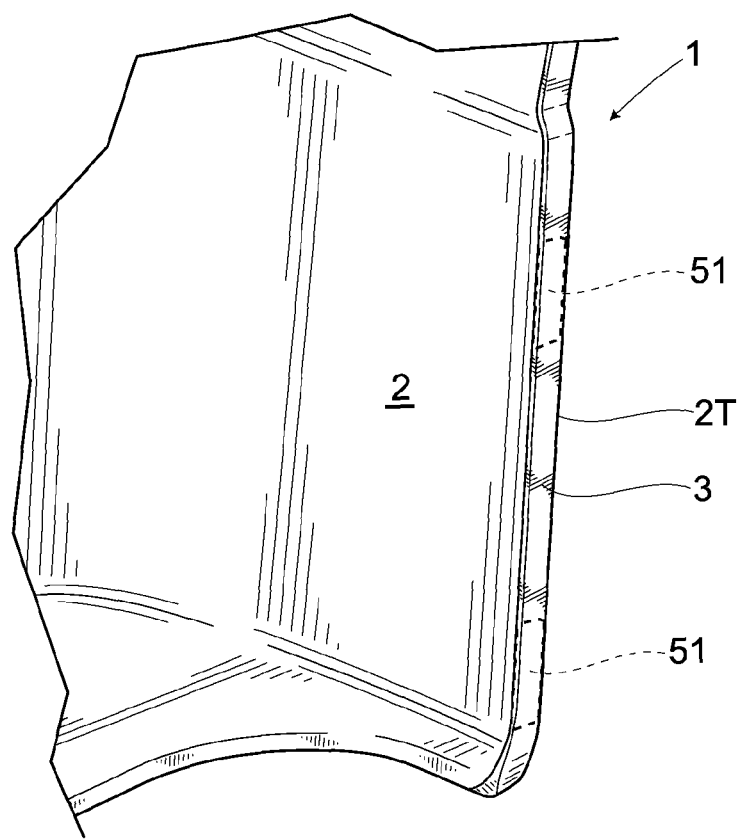
FIG. 4 is a perspective view of a relevant part of a rear bumper of the first embodiment of the present invention.
Figure 5:
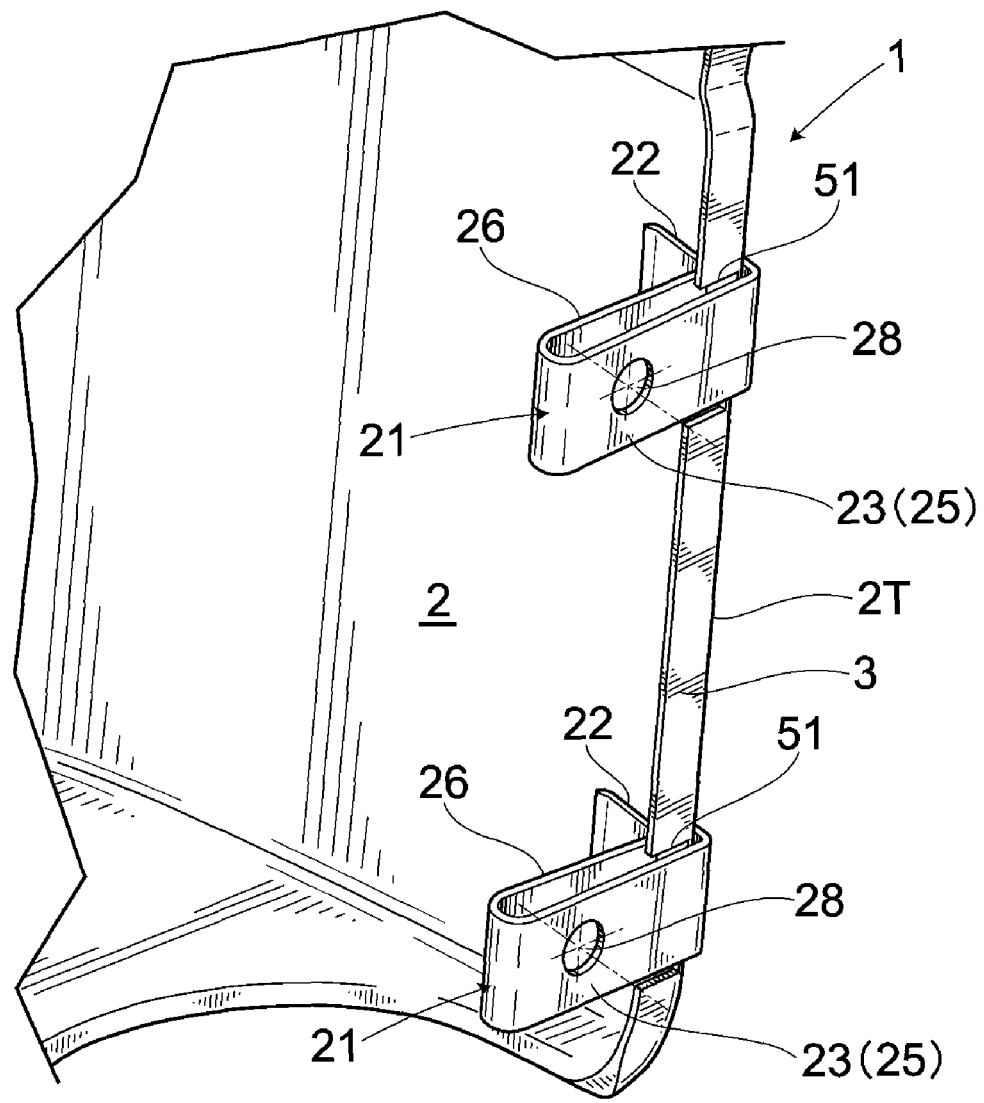
FIG. 5 is a perspective view of the rear bumper on which the mounting member is mounted according to the first embodiment of the present invention.
Figure 6:
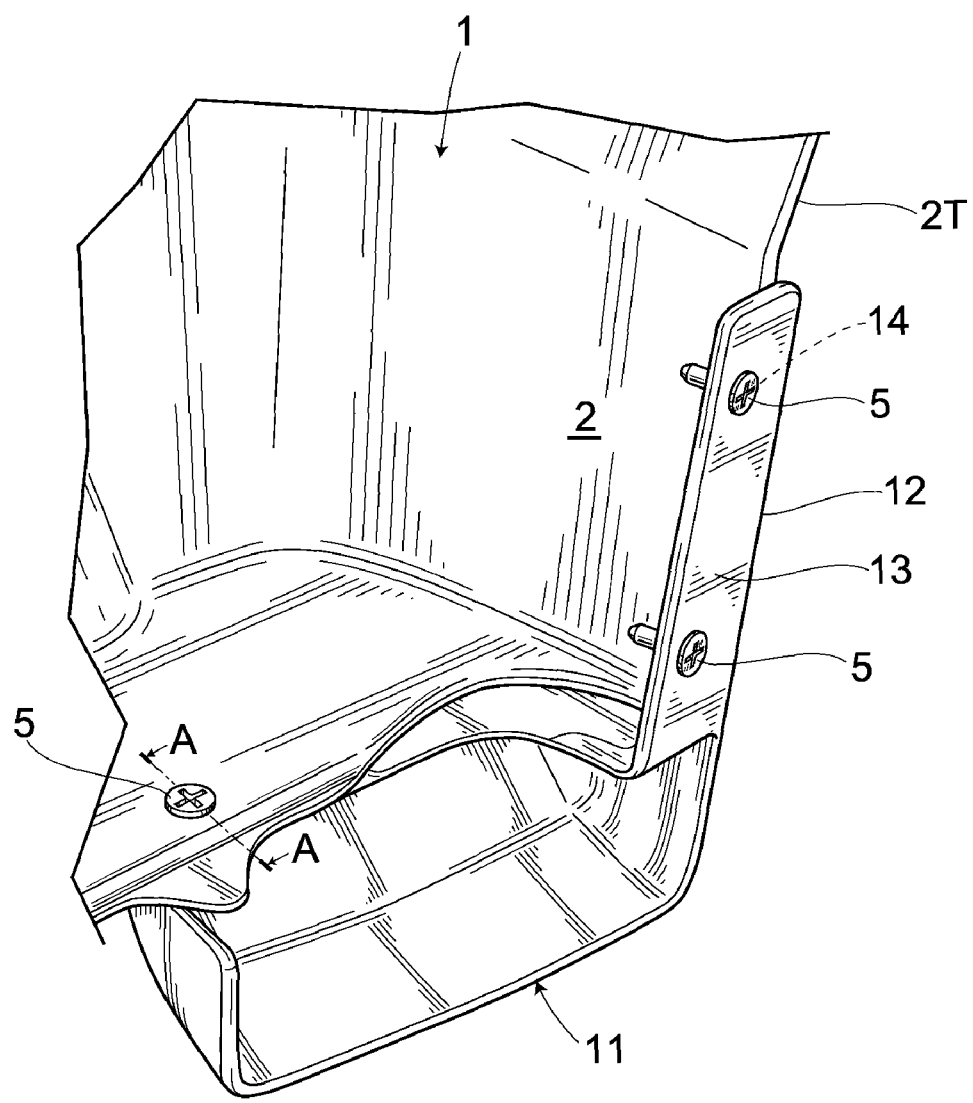
FIG. 6 is a perspective view showing a state in which a mudguard is mounted on the rear bumper according to the first embodiment of the present invention.

A method of mounting the mudguard 11 using the mounting member 21 is described hereunder. As shown in FIG. 4 and FIG. 5, when mounting the mounting members 21 on an upper and a lower portions of the end portion 2T, corresponding sections of the flange portion 3 on which the mounting members 21 are to be mounted are cut off with respect to a width of the mounting member 21. The clamping portion 22 is then adjusted around a corresponding end portion 2T where a cutout section 51 has been formed, thereby causing an end surface of the end portion 2T to abut against the outer plate 25. In this way, the mounting member 21 is allowed to clamp and be fixed to the end portion 2T by virtue of an elastic restoring force hindering the clamping portion 22 from opening, and the engagement portion 31 engaging the outer and inner surfaces of the end portion 2T.

Meanwhile, a through hole 14 is bored on the mounting edge portion 13 of the mudguard 11 with respect to the mounting member 21. Here, the through hole 14 may be bored at the time of manufacturing the mudguard 11. The screw portion 5A is then inserted into the through hole 14 and the through hole 28, followed by screwing the screw portion 5A into the screw hole 29, thereby allowing the mounting edge portion 13 to be mounted on and fixed to the mounting portion 23 of the mounting member 21. In this case, as indicated by an arrow in FIG. 1, a force bringing the inner plate 26 closer to the outer plate 25 is generated when screwing the screw portion 5A into the screw hole 29, thus causing the claw members 32, 33 of the inner plate 26 to reliably engage an end section of the end portion 2T.

With respect to a first aspect, this embodiment is a structure of mounting the mudguard 11 on the rear bumper 1 of the vehicle, in which the mudguard 11 is mounted on the rear bumper 1 using the mounting member 21. Further, the clamping portion 22 is provided on the one side of the mounting member 21 for clamping the end portion 2T of the rear bumper 1, while the mounting portion 23 is provided on the other side for allowing the mudguard 11 to be mounted thereon. In this way, the mounting member 21 can be mounted on the rear bumper 1 by allowing the clamping portion 22 to clamp the end portion 2T of the rear bumper 1, thereby reducing the number of steps needed for mounting and the number of parts needed, and thus reducing costs. In addition, since the mounting member 21 is superior in versatility, further reduction in costs can be expected.

Further, according to this embodiment and with respect to a second aspect, the engagement portion 31 is provided on the inner surface of the clamping portion 22 for engaging the rear bumper 1, thereby requiring no bolt when fixing the mounting member 21 to the rear bumper 1, and thus making mounting easier and reducing the number of parts needed.

Furthermore, according to this embodiment and with respect to a third aspect, since the clamping portion 22 has springiness, not only the mounting member 21 can be easily mounted on the rear bumper 1, but, vibration generated at the time of driving the vehicle can be absorbed, thus improving mounting safety.

Furthermore, as an effect of this embodiment, the clamping portion 22 and the mounting portion 23 are substantially perpendicular to one another, and the distance between the plates 25, 26 of the mounting portion 23 becomes narrower due to the screw 5, thereby causing the claw members 32, 33 of the inner plate 26 to slightly move toward the mounting portion 23, thus allowing the engagement portion 31 to further reliably engage the end portion 2T. Further, the plate 26 is caused to deform toward the plate 25 when screwing the screw 5, thus preventing the clamping portion 22 from opening.

(Second Embodiment)

Figure 8:
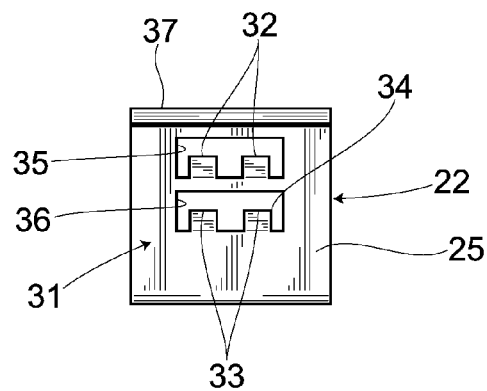
FIG. 8 is a side view of a mounting member of a second embodiment of the present invention.
Figure 9:
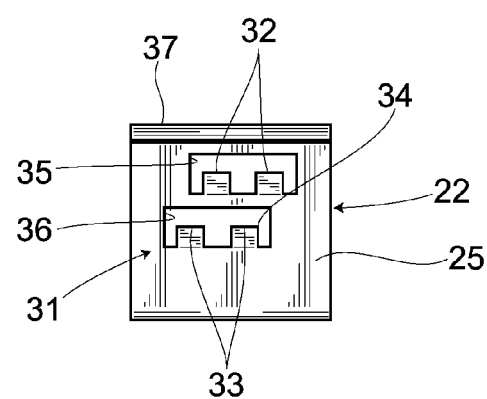
FIG. 9 is a side view of a mounting member of a modified embodiment of the second embodiment of the present invention, in which an arrangement of claw members of an engagement portion is modified.
Figure 10:
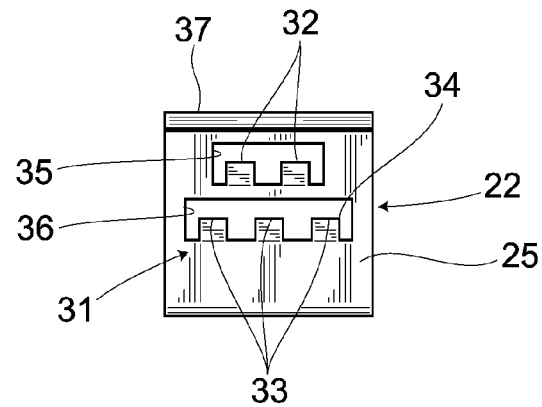
FIG. 10 is a side view of a mounting member of another modified embodiment of the second embodiment of the present invention, in which the arrangement of the claw members of the engagement portion is modified.

A second embodiment of the present invention is shown in FIG. 8 through FIG. 10. Same reference numbers are used to describe the same parts as those in the aforementioned embodiment, thereby omitting the detailed descriptions of such parts when describing the second embodiment. According to this embodiment, the arrangement of the claw members 32, 33 of the engagement portion 31 is modified as compared to the aforementioned embodiment. As shown in FIG. 8, a plurality (two) of the claw members 32, 32 are provided along with two claw members 33, 33 in a manner such that the claw member 32 on the front end side and the claw member 33 on the base end side correspond to one another. As shown in FIG. 9, the claw member 32 on the frond end side and the claw member 33 on the base end side are so arranged that they do not correspond to one another, but are out of alignment in the cross direction. And, as shown in FIG. 10, the number of the claw members 32 on the front end side and the number of the claw members 33 on the base end side are changed. Specifically, there are formed two claw members 32 on the front end side, and three claw members 33 on the base end side.

According to FIG. 8, since there are provided more claw members 32 on the front end side as compared to the first embodiment, retaining effect on the front end is improved. According to FIG. 9, retaining effect in a cross direction of the mounting member 21 is homogenized. And, according to FIG. 10, since there are provided more claw members 33 on the base end side as compared to the first embodiment, retaining effect on the base end side is improved.

(Third Embodiment)

Figure 11:
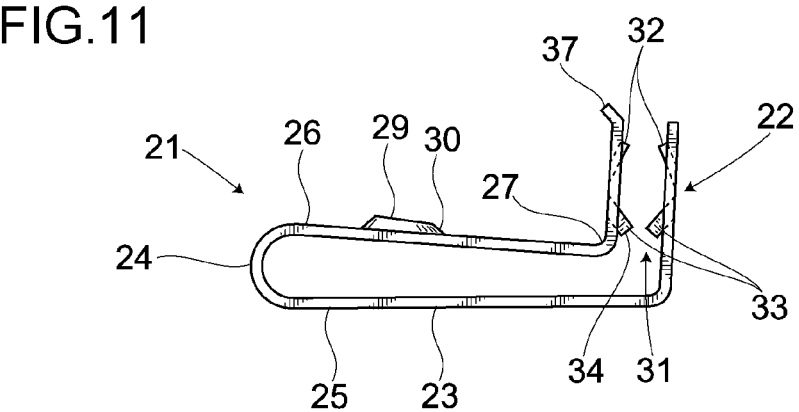
FIG. 11 is a plan view of a mounting member of a third embodiment of the present invention.
Figure 12:
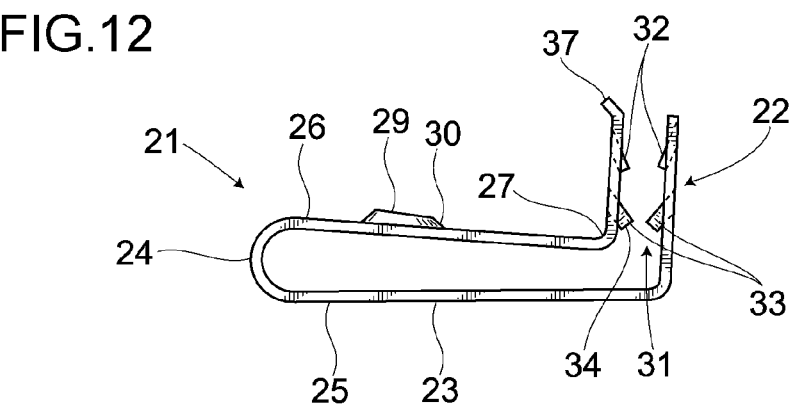
FIG. 12 is a plan view of a mounting member of a modified embodiment of the third embodiment of the present invention.

A third embodiment of the present invention is shown in FIG. 11 and FIG. 12. Same reference numbers are used to describe the same parts as those in the aforementioned embodiments, thereby omitting the detailed descriptions of such parts when describing the third embodiment. According to this embodiment, modifications are made to directions to which the claw members 32, 33 of the engagement portion 31 point. As shown in FIG. 11, the claw member 33 on the base end side is so formed that the corner portion 34 thereof slants toward the base end of the clamping portion 22. And, as shown in FIG. 12, both the claw members 32 and 33 are so formed that the corner portions 34 thereof slant toward the based end of the clamping portion 22.

In this sense, this embodiment brings about the same functions and effects as those of the aforementioned embodiments.

Further, with regard to the engagement portion 31 shown in FIG. 11, at least one of the claw members 33 is so formed that a front end thereof slants toward the base end of the clamping portion 22. Here, a direction to which such claw member 33 points is opposite to a direction in which the clamping portion 22 engages the end portion 2T, thereby making it difficult for the end portion 2T to be disengaged from the clamping portion 22.

Furthermore, with regard to the engagement portion 31 shown in FIG. 12, all the claw members 32 on the front end side and all the claw members 33 on the base end side point to the direction opposite to the direction in which the clamping portion 22 engages the end portion 2T, thereby making it more difficult for the end portion 2T to be disengaged from the clamping portion 22.

(Fourth Embodiment)

Figure 13:
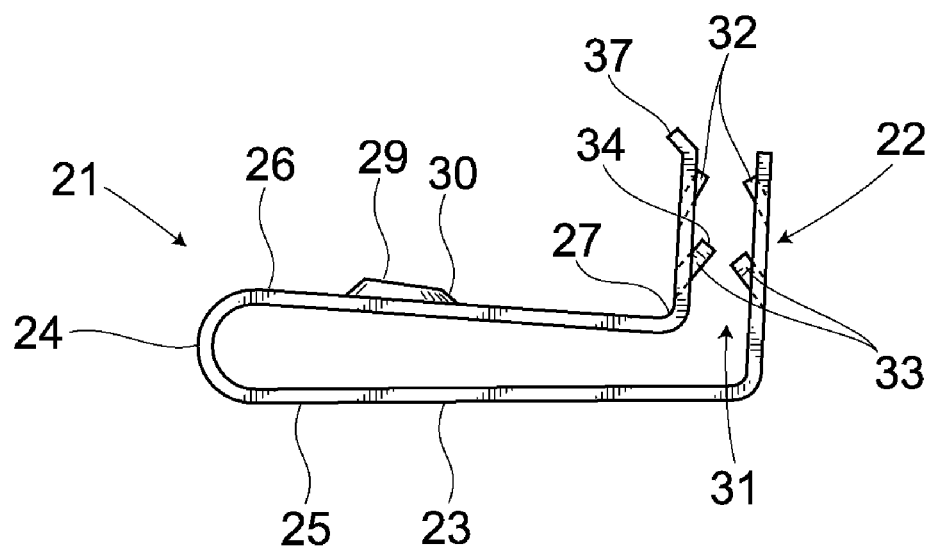
FIG. 13 is a plan view of a mounting member of a fourth embodiment of the present invention.

A fourth embodiment of the present invention is shown in FIG. 13. Same reference numbers are used to describe the same parts as those in the aforementioned embodiments, thereby omitting the detailed descriptions of such parts when describing the fourth embodiment. According to this embodiment, locations of the claw members 32, 33 of the engagement portion 31 are modified. More specifically, the locations of the claw members 32, 33 have been so shifted, in a longitudinal direction of the clamping portion 22, that the claw members 32, 33 of the outer plate 25 do not correspond to the claw members 32, 33 of the inner plate 26. As shown in FIG. 13, the locations of the claw members 32, 33 of the inner plate 26 have been shifted toward the front end of the clamping portion 22 with respect to the claw members 32, 33 of the outer plate 25.

In this sense, this embodiment brings about the same functions and effects as those of the aforementioned embodiments.

Further, according to this embodiment, since the locations of the claw members 32, 33 of the outer plate 25 and the inner plate 26 have been shifted, strength of mounting of the mounting member 21 relative to the rear bumper 1 can be improved.

Here, with regard to the claw members 32, 33 of the third embodiment, which are shown in FIG. 11 and FIG. 12 and pointing to the aforementioned directions, the locations of such claw members 32, 33 of the outer plate 25 and the inner plate 26 can also be shifted in the way as shown in FIG. 13. Further, such claw members 32, 33 can be arranged in the same ways as shown in FIG. 3 of the first embodiment, and FIG. 8 through FIG. 10 of the second embodiment. Particularly, in the second embodiment, the shapes of the aforementioned cutout sections 35, 36 are turned upside down in the drawings when modifying the directions to which the claw members 32, 33 point.

The present invention is not limited to this embodiment. As a matter of fact, various modified embodiments are possible without departing from the scope of the present invention. For example, mudguards of various shapes can be used. Further, it is obvious that the arrangement, the directions, the locations and the like of the claw members as described in the first embodiment through the fourth embodiment can be appropriately applied to one another to carry out the present invention without necessarily following the configurations as shown in the drawings.

What is claimed:

1. A mudguard mounting structure for mounting a mudguard on a rear bumper of a vehicle, said mudguard mounting structure comprising:
    a mounting member used to mount said mudguard on said rear bumper;
    a clamping portion provided on one side of said mounting member for clamping said mounting member to an end portion of said rear bumper;
    a mounting portion provided on a second side of said mounting member for mounting said mudguard on said rear bumper; and
    an engagement portion provided on an inner surface of said clamping portion for engaging said rear bumper,
    wherein said clamping portion comprises an inner plate and an outer plate and exhibits elastic restorability when subjected to a force urging said inner plate and said outer plate to open, and said engagement portion comprises claw members provided on inner surfaces of both said inner plate and said outer plate,
    wherein said mounting member is formed with said clamping portion on said one side by extending said outer plate and said inner plate from a bend-back portion on an one end of said mounting member toward an other end thereof, with a bended portion formed in a midsection of said outer plate and said inner plate, while said mounting member is formed with said mounting portion on said other side, and
    wherein said mounting portion is provided with a through-hole formed through said outer plate and a screw hole formed through said inner plate, corresponding to said through-hole, so that said mudguard is fixed to said mounting portion by allowing a screw to be inserted through a through-hole of said mudguard and said through-hole formed through said outer plate, and further screwing the same into said screw hole.

2. The mudguard mounting structure according to claim 1, wherein said claw members are provided on a front end side and on a base end side of said clamping portion.

3. The mudguard mounting structure according to claim 1, wherein said claw members are formed by cutting and then bending said outer plate and said inner plate inwardly.

4. The mudguard mounting structure according to claim 1, wherein said claw members are provided with corner portions on front end sides thereof.

* * * * *